US009463403B2

(12) United States Patent
Wakabayashi

(10) Patent No.: US 9,463,403 B2
(45) Date of Patent: Oct. 11, 2016

(54) OIL MIST SEPARATOR

(71) Applicant: TOYOTA BOSHOKU KABUSHIKI KAISHA, Aichi-ken (JP)

(72) Inventor: Keisuke Wakabayashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 196 days.

(21) Appl. No.: 14/322,338

(22) Filed: Jul. 2, 2014

(65) Prior Publication Data

US 2015/0052862 A1 Feb. 26, 2015

(30) Foreign Application Priority Data

Aug. 22, 2013 (JP) ................................ 2013-172636

(51) Int. Cl.

| | |
|---|---|
| ***B01D 45/00*** | (2006.01) |
| ***B01D 45/08*** | (2006.01) |
| ***F01M 13/04*** | (2006.01) |
| ***B01D 50/00*** | (2006.01) |
| ***B01D 45/16*** | (2006.01) |
| ***B01D 45/12*** | (2006.01) |
| ***F01M 13/00*** | (2006.01) |

(52) U.S. Cl.

CPC ............... *B01D 45/08* (2013.01); *B01D 45/12* (2013.01); *B01D 45/16* (2013.01); *B01D 50/002* (2013.01); *F01M 13/0011* (2013.01); *F01M 13/04* (2013.01); *F01M 2013/0433* (2013.01); *F01M 2013/0438* (2013.01); *F01M 2013/0461* (2013.01)

(58) Field of Classification Search

CPC .... B01D 45/08; B01D 50/002; B01D 45/16; B01D 45/12; F01M 13/0011; F01M 13/04; F01M 2013/0433; F01M 2013/0461; F01M 2013/0438

See application file for complete search history.

(56) References Cited

U.S. PATENT DOCUMENTS 3,676,024 A * 7/1972 Akaiki et al. .......... B01D 46/00 184/6
4,569,323 A * 2/1986 Okumura ........... F01M 13/0416 123/41.86
4,602,607 A * 7/1986 Balsley ................ F01M 13/023 123/41.86
4,627,406 A * 12/1986 Namiki .................. F01M 13/04 123/572
4,723,529 A * 2/1988 Yokoi ................ F01M 13/0416 123/41.86
6,345,614 B1 * 2/2002 Shureb ................... F01M 13/04 123/572
6,412,478 B1 * 7/2002 Ruehlow ............ F01M 13/0416 123/41.86
6,824,436 B2 * 11/2004 Matsuda ............. F01M 11/064 123/572

(Continued)

FOREIGN PATENT DOCUMENTS

JP 2009-121281 6/2009

*Primary Examiner* — Dung H Bui

(74) *Attorney, Agent, or Firm* — Greenblum & Bernstein, P.L.C.

(57) ABSTRACT

The oil mist separator includes a cylinder head cover made of a resin and having a form in which the bottom face is opened; and a baffle plate made of a resin and arranged so as to block the bottom face of the cylinder head cover. An introduction port which introduces the blow-by-gas, a circumferential wall extending upward from the circumference of the introduction port, and an oil inflow preventive board arranged on the lower side of the introduction port are formed in the baffle plate. The circumferential wall is welded, at its upper end part, with the cylinder head cover. Also, a nozzle hole through which the blow-by gas flows is formed in the circumferential wall. A separating member which separates the oil component from the blow-by gas having passed through the nozzle hole is provided on the downstream side of the nozzle hole.

5 Claims, 7 Drawing Sheets

(56) References Cited

U.S. PATENT DOCUMENTS

| | | | | |
|---|---|---|---|---|
| 7,644,706 | B1 * | 1/2010 | Yoshida | F01M 13/0011 123/572 |
| 7,938,875 | B2 * | 5/2011 | Son | F01M 13/0011 123/198 E |
| 2002/0189213 | A1 * | 12/2002 | Neuschwander | B01D 45/08 55/385.3 |
| 2004/0103889 | A1 * | 6/2004 | Akiyama | F01M 13/04 123/572 |
| 2005/0005921 | A1 * | 1/2005 | Ikeda | F01M 13/023 123/572 |
| 2006/0032486 | A1 * | 2/2006 | Prasad | F01M 13/04 123/572 |
| 2007/0215128 | A1 * | 9/2007 | Yonebayashi | F01M 13/0416 123/572 |
| 2009/0250044 | A1 * | 10/2009 | Braun | B01D 45/06 123/573 |
| 2010/0006075 | A1 * | 1/2010 | Ruppel | F01M 13/023 123/573 |
| 2010/0095922 | A1 * | 4/2010 | Nakajima | F01M 13/0416 123/196 A |
| 2011/0179755 | A1 * | 7/2011 | Gruhler | B29C 65/58 55/320 |
| 2011/0314779 | A1 * | 12/2011 | Sakaguchi | F01M 13/0416 55/464 |
| 2012/0297980 | A1 * | 11/2012 | Slaughter | B01D 45/08 95/272 |
| 2012/0312272 | A1 * | 12/2012 | Kobayashi | F01M 13/0416 123/196 R |
| 2013/0125865 | A1 * | 5/2013 | Kobayashi | F01M 13/0416 123/573 |
| 2014/0165512 | A1 * | 6/2014 | Horiuchi | F01M 13/04 55/322 |
| 2015/0337698 | A1 * | 11/2015 | Ruppel | F01M 13/04 123/41.86 |

* cited by examiner

OIL MIST SEPARATOR

CROSS-REFERENCE TO RELATED APPLICATIONS

The present application claims priority under 35 U.S.C. §119 of Japanese Application No. 2013-172636 filed on Aug. 22, 2013, the disclosure of which is expressly incorporated by reference herein in its entirety.

BACKGROUND OF THE INVENTION

1. Technical Field

The present invention relates to an oil mist separator, and, more specifically, to an oil mist separator which can enhance the sealability around a nozzle hole, thereby improving the oil separation efficiency and can also improve the productivity.

2. Description of Related Art

Oil mist separators having a gas-liquid separation structure which separates an oil component in a blow-by gas in a flow path for a blow-by gas formed within a cylinder head cover are generally known as conventional oil mist separators. As such oil mist separators, for example, providing a partition wall including a nozzle hole formed within a flow path for a blow-by gas and colliding the blow-by gas with a collision board provided on the downstream side of this pore for inertial separation of an oil are disclosed (for example, see JP 2009-121281 A).

When a partition wall is provided within a flow path for a blow-by gas as in JP 2009-121281 A, a gap may sometimes be created between the cylinder head cover and the partition wall by the influences of dimensional tolerance and the like. As a result, the blow-by gas is in danger of flowing not only through the nozzle hole, but also into the gap, thereby causing the deterioration in oil separation efficiency. When the partition wall is integrally molded with a cylinder head cover made of a resin in order not to create such a gap, the shape of the cylinder head cover becomes complicated, resulting in a complicated structure of a mold for molding this.

SUMMARY OF THE INVENTION

The embodiment of the present invention has been made in light of the above-described actual situation, and aims at providing an oil mist separator which can enhance the sealability around a nozzle hole, thereby improving the oil separation efficiency and can also improve the productivity.

One aspect of the present embodiments provides an oil mist separator arranged in an engine cylinder head part to separate an oil component from a blow-by gas, the oil mist separator including a cylinder head cover made of a resin and having a form in which the bottom face is opened, and a baffle plate made of a resin and arranged so as to block the bottom face of the cylinder head cover. An introduction port which introduces the blow-by-gas, a circumferential wall having such a form as to extend upward from the circumference of the introduction port, and an oil inflow preventive board arranged on the lower side of the introduction port are formed in the baffle plate. The circumferential wall is welded, at its upper end part, with the cylinder head cover. A nozzle hole through which the blow-by gas flows is formed in the circumferential wall. A separating means which separates the oil component from the blow-by gas having passed through the nozzle hole is provided on the downstream side of the nozzle hole.

In a further aspect, the circumferential wall is integrally formed with the baffle plate, and has a double structure comprising an inner wall and an outer wall.

In a further aspect, the circumferential wall is formed in such a manner that a welding jig can be inserted from the lower side between the inner wall and the outer wall.

In a further aspect, the inner wall and the outer wall are connected at the upper end part, and not connected at the lower end part.

In a further aspect, the separating means includes a collision board with which the blow-by gas having passed through the nozzle hole collides.

The oil mist separator of this embodiment includes a cylinder head cover made of a resin and having a form in which the bottom face is opened; and a baffle plate made of a resin and arranged so as to block the bottom face of the cylinder head cover. An introduction port which introduces the blow-by-gas, a circumferential wall having such a form as to extend upward from the circumference of the introduction port, and an oil inflow preventive board arranged on the lower side of the introduction port are formed in the baffle plate. The circumferential wall is welded, at its upper end part, with the cylinder head cover. A nozzle hole through which the blow-by gas flows is formed in the circumferential wall. A separating means which separates the oil component from the blow-by gas having passed through the nozzle hole is provided on the downstream side of the nozzle hole. Such configuration can enhance the sealability around a nozzle hole, thereby improving the oil separation efficiency. Also, a cylinder head cover having a simple structure can be employed as compared with the case where a partition wall having a nozzle hole is formed on the cylinder head cover side, and can be molded by using a mold having a simple structure. As a result, the productivity can be improved. Further, an oil inflow preventive board is provided, thereby making it possible to inhibit the entry of an oil splashed, for example, from a cam, a cam shaft, a chain and a vacuum pump of an engine into the introduction port.

Also, when the circumferential wall is integrally formed with the baffle plate, the number of parts can be reduced as compared with the case where the circumferential wall is formed separately from the baffle plate. When the circumferential wall has a double structure including an inner wall and an outer wall, it is possible both to ensure the rigidity of the circumferential wall and to reduce the weight thereof.

Further, when the circumferential wall is formed in such a manner that a welding jig can be inserted from the lower side between the inner wall and the outer wall, it is possible to easily and reliably fix the baffle plate onto the welding jig during vibration welding.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF THE PREFERRED EMBODIMENTS

Figure 1:
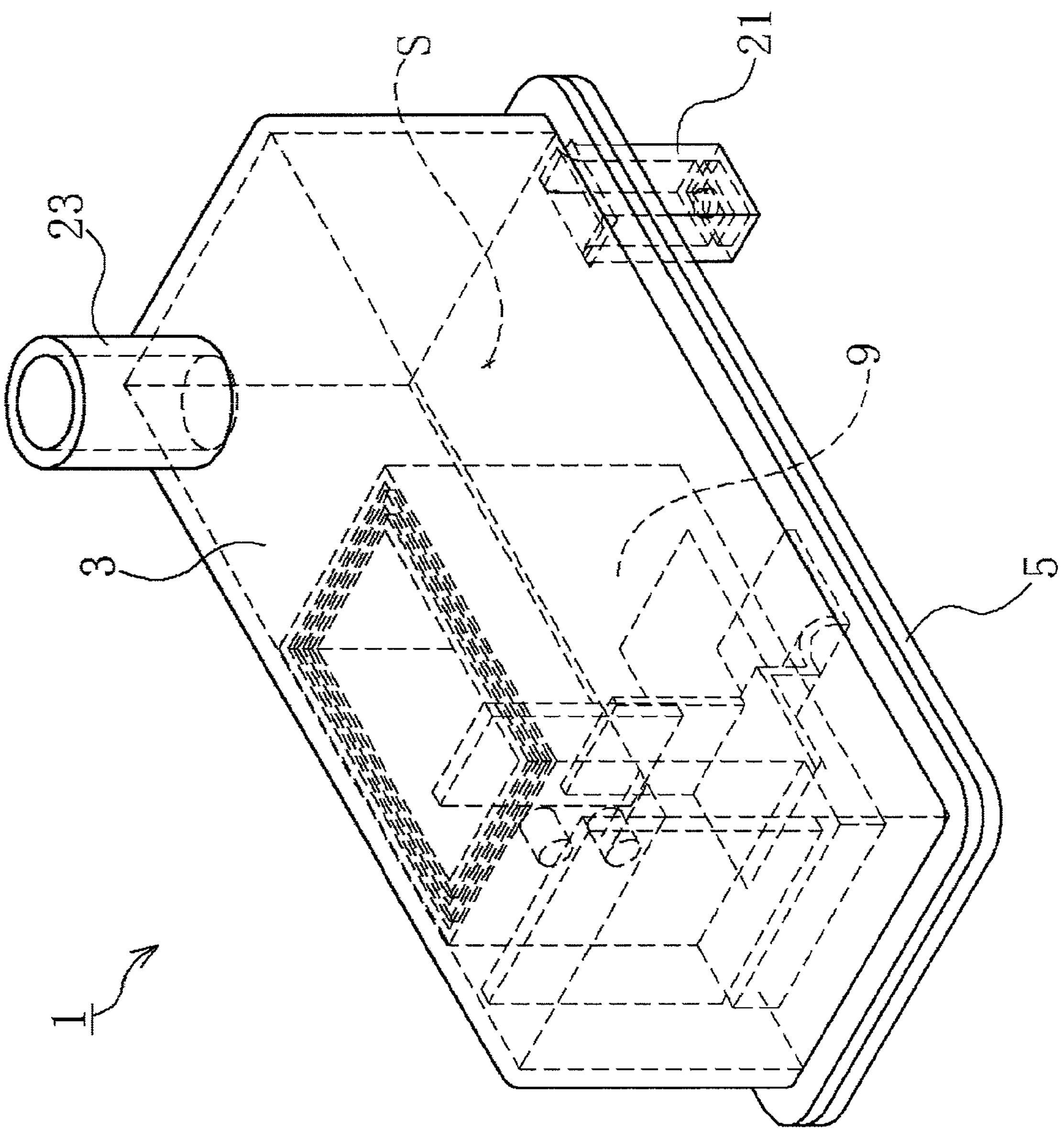
FIG. 1 is a perspective view showing an oil mist separator according to an Example.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An oil mist separator (1) of this embodiment is arranged in an engine cylinder head part to separate an oil component from a blow-by gas. The oil mist separator (1) includes a cylinder head cover (3) made of a resin and having a form in which the bottom face is opened; and a baffle plate (5) made of a resin and arranged so as to block the bottom face of the cylinder head cover (3). An introduction port (7) which introduces the blow-by-gas, a circumferential wall (9) having such a form as to extend upward from the circumference of the introduction port (7), and an oil inflow preventive board (15) arranged on the lower side of the introduction port are formed in the baffle plate (5).

The circumferential wall (9) is welded, at its upper end part, with the cylinder head cover. A nozzle hole (11) through which the blow-by gas flows is formed in the circumferential wall (9). A separating means (collision board 13) which separates the oil component from the blow-by gas having passed through the nozzle hole (11) is provided on the downstream side of the nozzle hole (11) (for example, see FIGS. 1 to 5).

The size, opening shape and the like of the above-described introduction port (7) do not especially matter.

The above-described circumferential wall (9) may be formed separately from the baffle plate (5) and attached, for example, by welding. However, the above-described circumferential wall (9) is preferably integrally molded with the baffle plate (5), for example, by injection molding. The circumferential wall (9) can be constructed so as to have a double structure including an inner wall (9A) and an outer wall (9B). In this case, the circumferential wall (9) can be formed such that a welding jig (37) can be inserted from the lower side between the inner wall (9A) and the outer wall (9B).

The size, shape and the like of the above-described oil inflow preventive board (15) do not especially matter.

The cross section shape, size, number and the like of the above-described nozzle hole(s) (11) do not especially matter. Also, the site where the nozzle hole (11) is formed in the circumferential wall (9) is not especially limited.

The manner of separation of the oil component from the blow-by gas by the above-described separating means does not especially matter. The separating means can include, for example, a form having a collision board (13) which collides the blow-by gas having passed through the nozzle hole (11) and accelerated in flow rate (for example, see FIGS. 2 to 4). In this case, a form in which a wall part (3A, 3B) of the cylinder head cover (3) is utilized as the collision board may also be employed.

Figure 8:
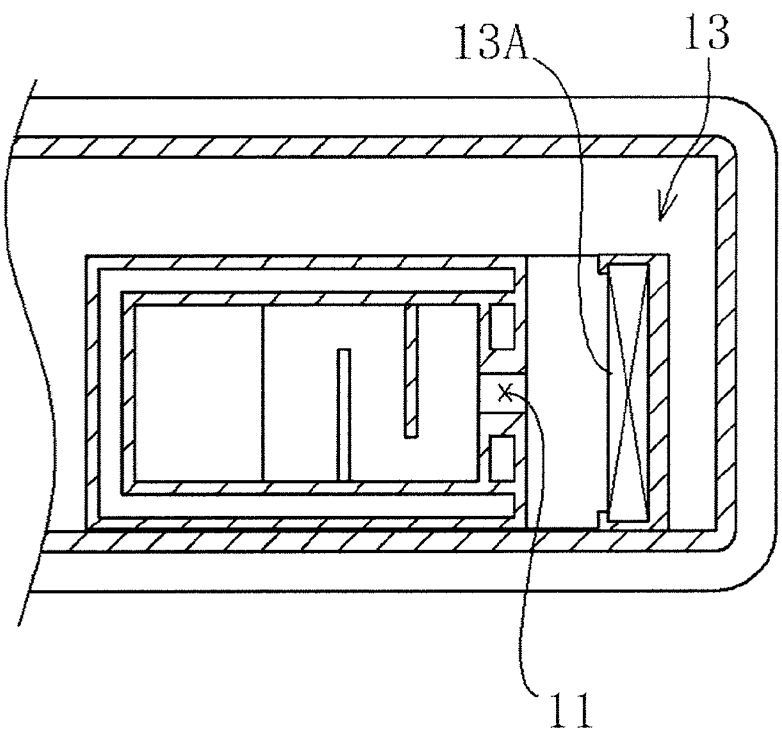
FIG. 8 is an explanatory view for explaining an oil mist separator according to another embodiment.

The above-described separating means can include, for example, a form having a filter element (13A) provided on the face on the side opposite to the nozzle hole (11) (for example, see FIG. 8). This causes the blow-by gas from the nozzle hole (11) to collide with and pass through the filter element (13A), thereby making it possible to improve the oil separation function.

Also, as yet another form of the separating means, for example, a form having a valve body (13B) provided so as to be biased from the downstream side to block the nozzle hole (11) and so as to be opened/closed by the pressure of the blow-by gas (for example, see FIG. 9) can be indicated.

The reference numerals in parentheses, which are attached to the respective features described in the above embodiment, show a correspondence relation with the specific features described in the Example which will be described below.

Examples

Hereinafter, the present invention will be explained in detail by way of Examples with reference to the drawings.

(1) Construction of Oil Mist Separator

An oil mist separator 1 according to this Example is arranged in a cylinder head part of a vehicle engine. The oil mist separator 1 separates a mist oil component from a blow-by gas generated in the engine. As shown in FIGS. 1 to 6, the oil mist separator 1 includes a cylinder head cover 3 and a baffle plate 5. These cylinder head cover 3 and baffle plate 5 are made of a resin, and formed by injection molding.

Figure 2:
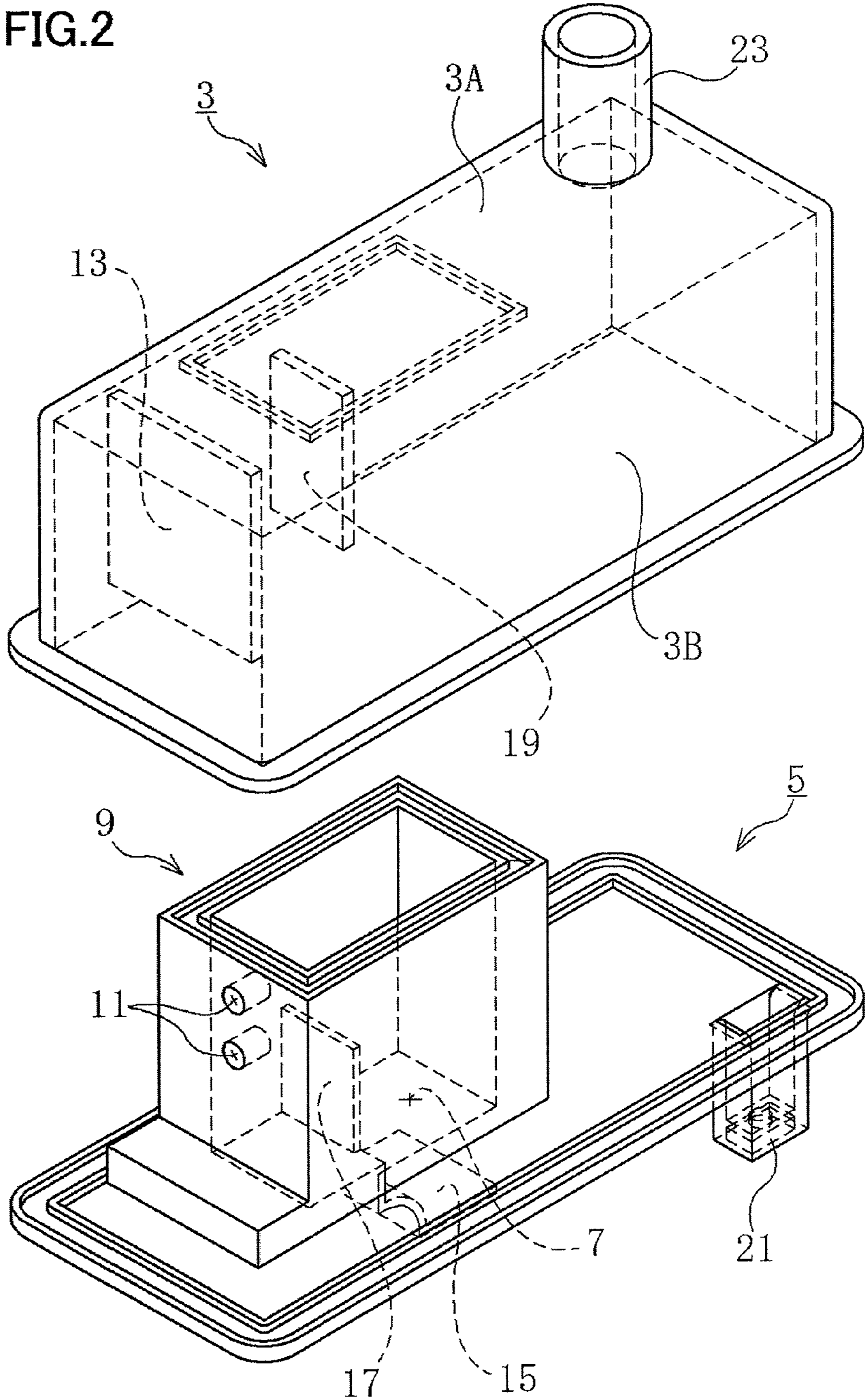
FIG. 2 is an exploded perspective view showing the oil mist separator according to the Example.

As shown in FIG. 2, the cylinder head cover 3 includes an upper wall 3A and a side wall 3B, and has an elongated box-like shape in which the bottom face is opened. Also, the baffle plate 5 is formed in an elongated plate shape so as to block the bottom face of the cylinder head cover 3. The baffle plate 5 is welded, at its circumferential edge part, with the lower end of the side wall 3B of the cylinder head cover 3 by vibration welding. An elongated closed space S is formed in the oil mist separator 1 by these cylinder head cover 3 and baffle plate 5.

Figure 3:
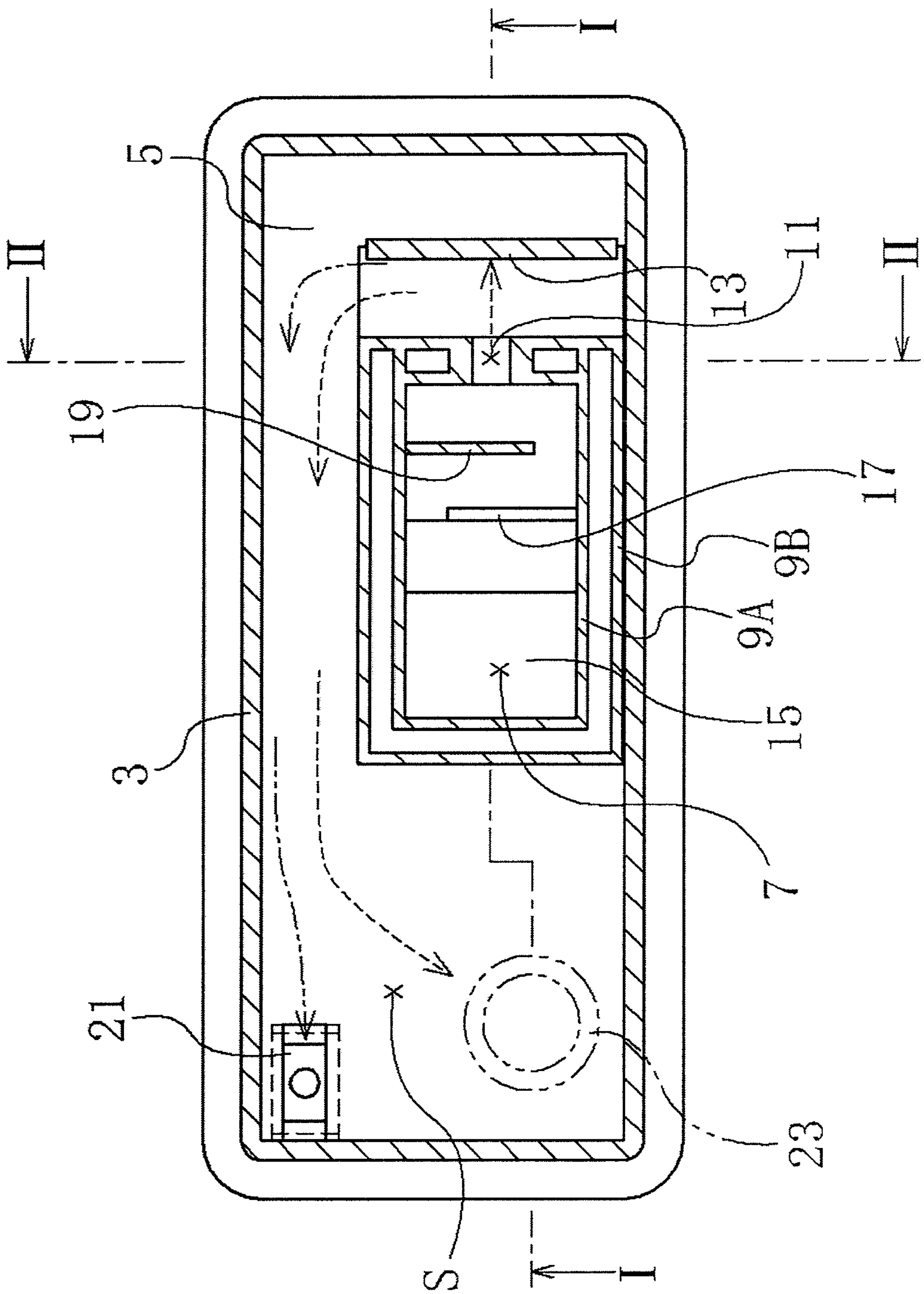
FIG. 3 is a transverse cross sectional view showing the oil mist separator according to the Example.
Figure 4:
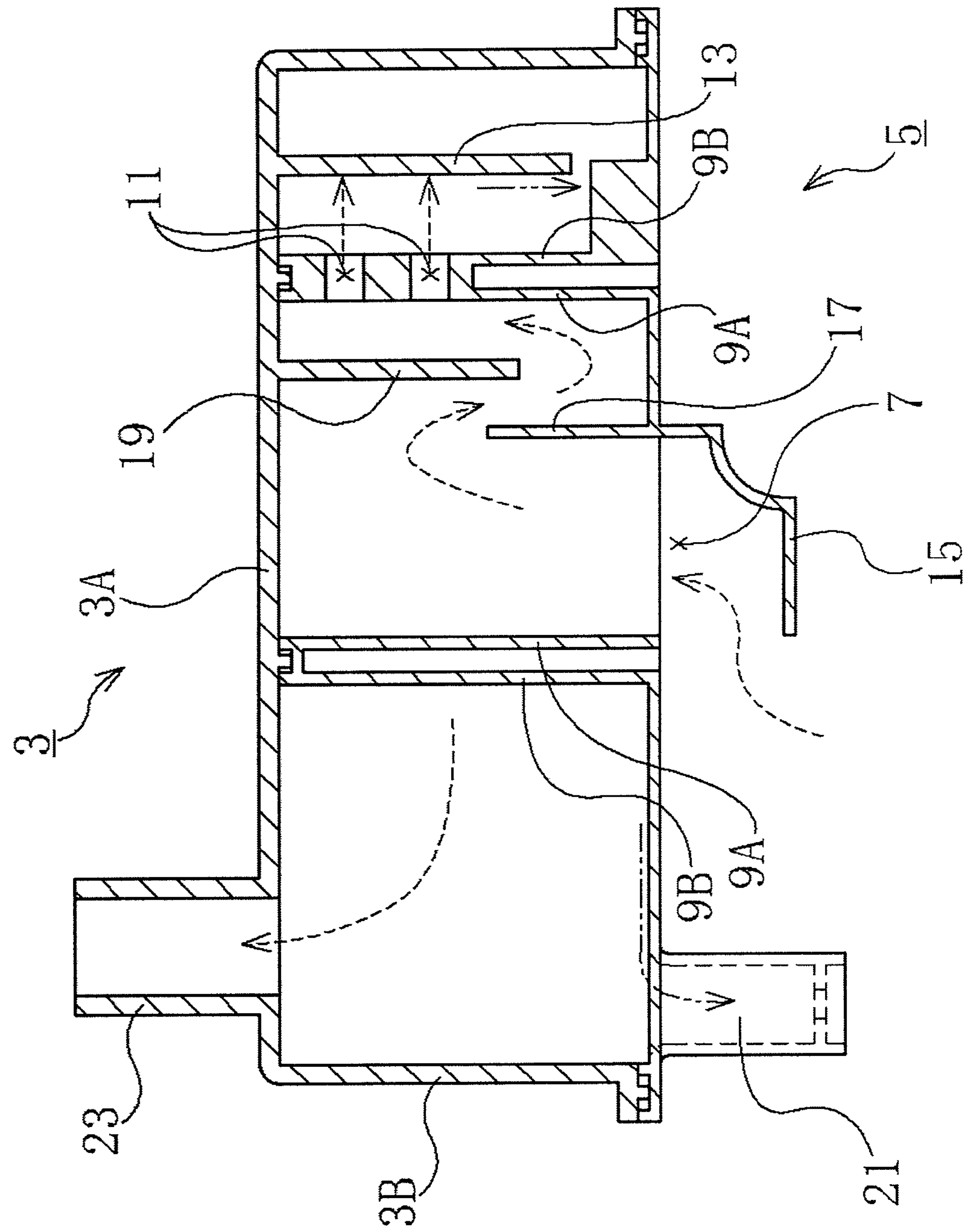
FIG. 4 is a cross sectional view along the line I-I in FIG. 3.

As shown in FIGS. 2 to 4, an introduction port 7 and a circumferential wall 9 are formed in the baffle plate 5. The introduction port 7 is an opening for introducing the blow-by gas generated in the engine into the closed space S from the lower side of the baffle plate 5. The circumferential wall 9 is formed so as to extend upward from the circumference of the introduction port 7. The upper end part of this circumferential wall 9 is welded with the lower face of the upper wall 3A of the cylinder head cover 3 by vibration welding.

Figure 5:
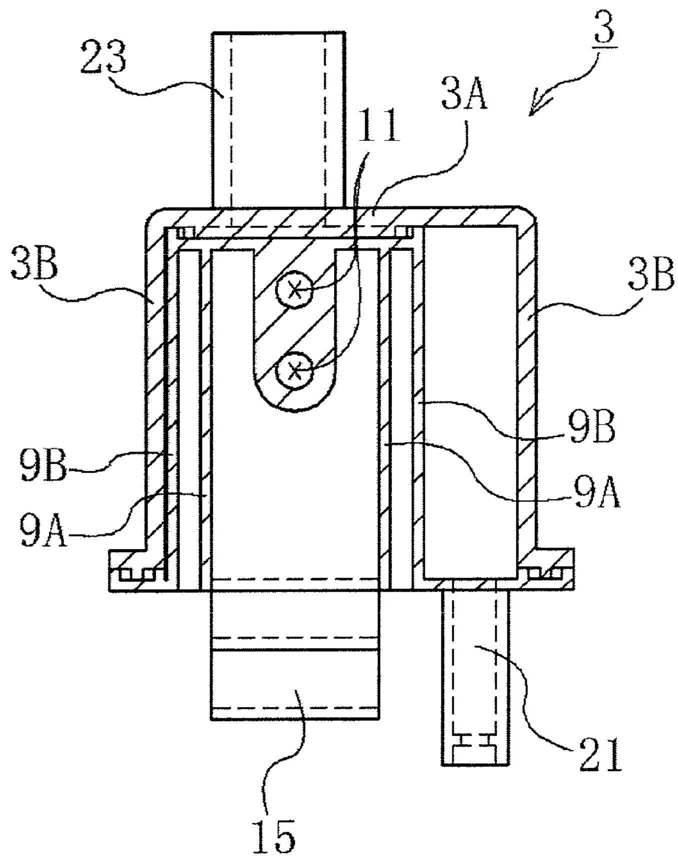
FIG. 5 is a cross sectional view along the line II-II in FIG. 3.

In this Example, the circumferential wall 9 is integrally molded with the baffle plate 5 by injection molding. The circumferential wall 9 has a double structure including an inner wall 9A and an outer wall 9B, as shown in FIGS. 3 to 5. The circumferential wall 9 is such that the inner wall 9A and the outer wall 9B are connected at the upper end part. Also, the circumferential wall 9 is opened at its lower end part, and has a space formed between the inner wall 9A and the outer wall 9B. This makes it possible to insert a welding jig from the lower side between the inner wall 9A and the outer wall 9B during vibration welding.

Also, a nozzle hole 11 is formed in the circumferential wall 9. In this Example, a plurality of the nozzle holes 11 (two in FIG. 2) is formed to be aligned in the vertical direction. The blow-by gas introduced from the introduction port 7 is introduced into the closed space S via these nozzle holes 11.

A separating means is provided on the downstream side of the nozzle holes 11. In this Example, a collision board 13 is employed as the separating means as shown in FIGS. 3 and 4. The collision board 13 is integrally molded with the cylinder head cover 3 so as to extend downward from the upper wall 3A of the cylinder head cover 3. The blow-by gas having passed through the nozzle holes 13 and accelerated in flow rate collides with this collision board 13. This leads to inertial separation of the oil component contained in the blow-by gas.

Also, the baffle plate 5 is provided with an oil inflow preventive board 15. The oil inflow preventive board 15 is arranged on the lower side of the introduction port 7 as shown in FIG. 4. In this Example, the oil inflow preventive board 15 is integrally molded with the baffle plate 5 by injection molding.

As shown in FIGS. 3 and 4, baffle boards 17, 19 are arranged in a space defined by the circumferential wall 9. The baffle board 17 is provided so as to extend upward from the upper face of the oil inflow preventive board 15. The baffle board 19 is provided so as to extend downward from the upper wall 3A of the cylinder head cover 3. These baffle boards 17, 19 are arranged so that the blow-by gas flows along a serpentine course and that the space defined by the circumferential wall 9 is in a labyrinth-like form, in plan view and side view, respectively.

As shown in FIGS. 2 to 5, the oil mist separator 1 according to this Example is provided with an oil discharge part 21 which discharges the oil separated from the blow-by gas to the outside of the closed space S, and a gas outflow part 23 which causes the blow-by gas from which an oil has been separated to flow out to an intake system of the engine.

As shown in FIGS. 4 and 5, the oil discharge part 21 is cylindrically formed so as to extend downward from the baffle plate 5, and a hole having a smaller section area than that of the cylindrical portion is formed in its bottom part. This leads to the accumulation of the separated oil within the oil discharge part 21, and the oil is designed so as to be discharged to the outside against the pressure within the closed space S when the oil is accumulated up to a predetermined height.

Also, the gas outflow part 23 is formed penetrating through the upper wall 3A of the cylinder head cover 3 as shown in FIGS. 4 and 5.

(2) Method for Producing Oil Mist Separator

Figure 6:
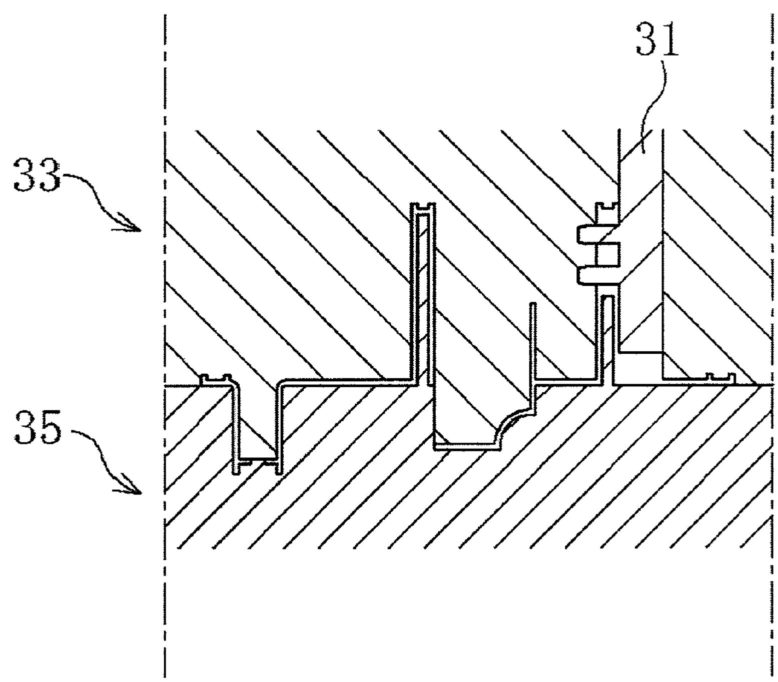
FIG. 6 is an explanatory view for explaining a method for producing a baffle plate according to the Example.

Next, a method for producing the oil mist separator 1 having the above-described configuration will be explained. The cylinder head cover 3 and baffle plate 5 according to this Example are each obtained by injection molding of a resin. Of these members, the baffle plates where the circumferential wall 9, inflow preventive board 15 and the like are formed is in a relatively complicated shape, but, as shown in FIG. 6, can be easily molded by using an upper mold 33 having a slide part 31 for forming the nozzle holes 11 and a lower mold 35. The cylinder head cover 3 having a relatively simple shape can be more easily molded by so-called vertical draw.

Figure 7:
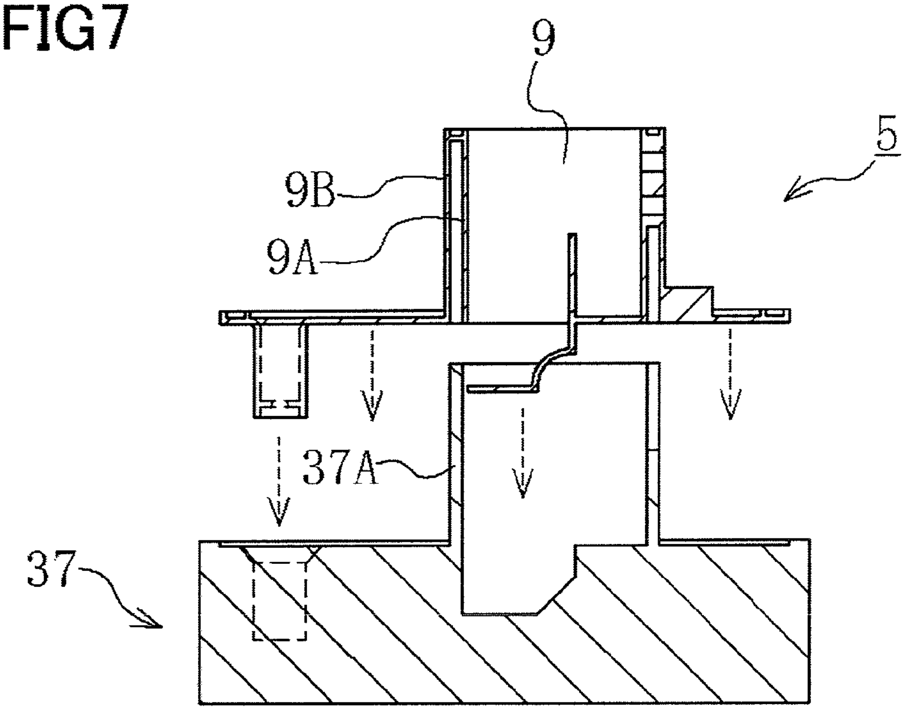
FIG. 7 is an explanatory view for explaining a method for producing a baffle plate according to the Example.

After molding of the respective parts, those members are bonded by vibration welding. Specifically, the lower end part of the side wall 3B of the cylinder head cover 3 and the circumferential edge part of the baffle plate 5 are abutted against each other, and, along with this, the upper end part of the circumferential wall 9 and the upper wall 3A of the cylinder head cover 3 are abutted against each other, and bonded by vibration welding. At this time, an insertion part 37A of the welding jig 37 is inserted between the inner wall 9A and the outer wall 9B of the circumferential wall 9 as shown in FIG. 7. This leads to the reliable fixation of the baffle plate 5 onto the welding jig 37. Also, the circumferential wall 9 is reinforced by insertion of the insertion part 37A, so that flexure during vibration is suppressed.

The oil mist separator 1 is obtained in the above manner.

(3) Action of Oil Mist Separator

Next, the action of the oil mist separator 1 having the above-described construction will be explained. The oil mist separator 1 sucks the blow-by gas generated within the engine due to the fact that the gas outflow part 23 is connected to the intake system of the engine. Therefore, the blow-by gas flows through the space defined by the circumferential wall 9, nozzle holes 11 and closed space S in this order as shown by dashed arrows in FIGS. 3 and 4. The blow-by gas, when passing through the space defined by the circumferential wall 9, flows along a serpentine course since this space is formed like a labyrinth by the baffle boards 17, 19. This leads to inertial separation of an oil component present as relatively large particles in the oil component contained in the blow-by gas. The separated oil is refluxed along the surface of the oil inflow preventive board 15.

Also, the blow-by gas is accelerated in flow rate when passing through the nozzle holes 11. The blow-by gas collides with the collision board 13 which is a separating means in a state where it is accelerated in flow rate. At this time, the oil mist inertially collides with the collision board 13 and adheres onto the surface thereof. This causes the separation of the oil from the blow-by gas. The oils adhered onto the surface of the collision board 13 gradually aggregate and drop downward of the collision board 13. The oil separated in this manner is discharged from the oil discharge part 21 along the surface of the baffle plate 5 as shown by a two-dot chain arrow in FIGS. 3 and 4. The blow-by gas from which the oil component has been separated flows out to the intake system of the engine from the gas outflow part 23.

(4) Effect of the Example

In view of the above, the oil mist separator 1 of this Example includes a cylinder head cover 3 made of a resin and having a form in which the bottom face is opened; and a baffle plate 5 made of a resin and arranged so as to block the bottom face of the cylinder head cover 3. An introduction port 7 which introduces the blow-by-gas, a circumferential wall 9 having such a form as to extend upward from the circumference of the introduction port 7, and an oil inflow preventive board 15 arranged on the lower side of the introduction port 7 are formed in the baffle plate 5. The circumferential wall 9 is welded, at its upper end part, with the cylinder head cover 3. A nozzle hole 11 through which the blow-by gas flows is formed in the circumferential wall 9. A collision board 13 for separating the oil component from the blow-by gas having passed through the nozzle hole 11 is provided on the downstream side of the nozzle hole 11. Such configuration can enhance the sealability around the nozzle hole 11, thereby improving the oil separation efficiency. Also, a cylinder head cover having a simple structure can be employed as compared with the case where a partition wall having a nozzle hole 11 is formed on the cylinder head cover 3 side, and can be molded by using a mold having a simple structure. As a result, the productivity can be improved. Further, the oil inflow preventive board 15 is provided, thereby making it possible to inhibit the entry of an oil splashed, for example, from a cam, a cam shaft, a chain and a vacuum pump of an engine into the introduction port 7.

Also, the circumferential wall 9 is integrally formed with the baffle plate 5 in the above-described Example. Therefore, the number of parts can be reduced as compared with the case where the circumferential wall is formed separately from the baffle plate. When the circumferential wall 9 has a double structure including the inner wall 9A and the outer wall 9B, it is possible both to ensure the rigidity of the circumferential wall and to reduce the weight thereof.

Further, the circumferential wall 9 is formed such that a welding jig can be inserted from the lower side between the inner wall 9A and the outer wall 9B in the above-described Example. Therefore, it is possible to easily and reliably fix the baffle plate onto the welding jig during vibration welding.

Figure 9:
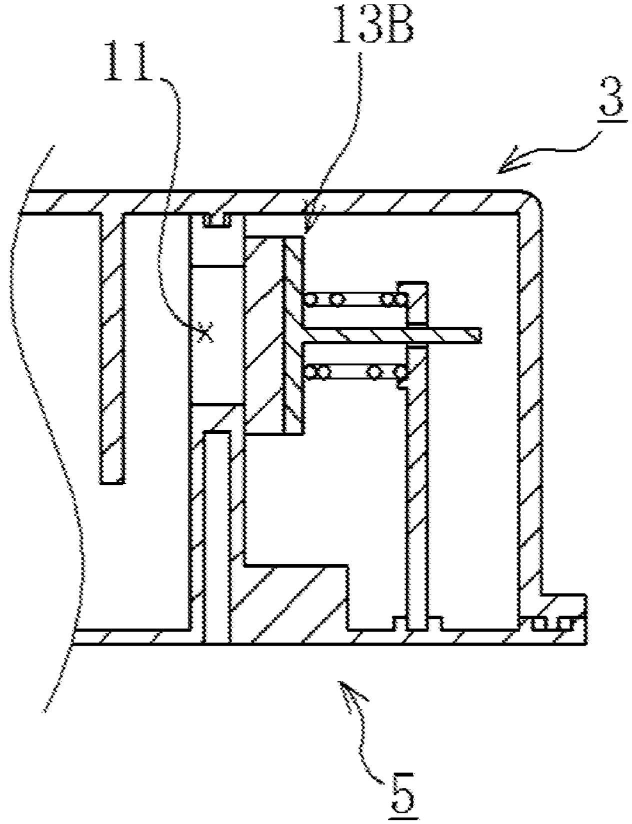
FIG. 9 is an explanatory view for explaining an oil mist separator according to another embodiment.

In the meantime, the present invention is not limited to the above-described Example, and Examples variously modified within the scope of the present invention can be employed depending on the purpose and intended use. For example, the plate-like collision board 13 has been illustrated as the separating means in the above-described Example, but the present invention is not limited to this. For example, as shown in FIG. 8, a collision board 13 having a filter element 13A made of a nonwoven fabric or the like on the face on the side opposite to a nozzle hole 11 may also be adopted. Also, as shown in FIG. 9, a form having a valve body 13B provided so as to be biased from the downstream side to block the nozzle hole 11 and so as to be opened/closed by the pressure of the blow-by gas may also be adopted. Also, in this case, the valve body 13B may be provided with a filter element on the face opposite to the nozzle hole 11.

Also, the plate-like collision board 13 formed so as to extend downward from the upper wall 3A of the cylinder head cover has been illustrated as the collision board in the above-described Example, but the present invention is not limited to this. For example, a form in which the blow-by gas from the nozzle hole is caused to directly collide, for example, with the upper wall or side wall of the cylinder head cover and these walls are used as collision boards may also be adopted.

Also, the circumferential wall 9 integrally molded with the baffle plate 5 has been illustrated in the above-described Example, but the present invention is not limited to this. For example, a circumferential wall attached later to the baffle plate, for example, by adhesion, welding, fitting or bolting may also be adopted.

Further, the collision board 13 integrally molded with the upper wall 3A of the cylinder head cover 3 has been illustrated in the above-described Example, but the present invention is not limited to this. For example, a collision board integrally molded with the side wall of the cylinder head cover or the baffle plate may also be adopted. Further, the collision board may not be integrally molded, and, for example, may be attached later to the cylinder head cover or baffle plate, for example, by adhesion, welding, fitting or bolting.

The present invention is widely utilized as a technique for separating and collecting an oil component contained in a blow-by gas.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. An oil mist separator arranged in an engine cylinder head part to separate an oil component from a blow-by gas, the oil mist separator comprising:

a cylinder head cover made of a resin and having a form in which a bottom face of the cylinder head cover is opened; and a baffle plate made of a resin and arranged so as to block the bottom face of the cylinder head cover, wherein:

an introduction port which introduces the blow-by-gas, a circumferential wall having such a form as to extend upward from a circumference of the introduction port, and an oil inflow preventive board arranged on a lower side of the introduction port are formed in the baffle plate;

wherein the circumferential wall surrounds the introduction port;

the circumferential wall is welded, along an entire circumference of an upper end part of the circumferential wall, to the cylinder head cover;

a nozzle hole through which the blow-by gas flows is formed in the circumferential wall; and a separating member which separates the oil component from the blow-by gas having passed through the nozzle hole is provided on a downstream side of the nozzle hole wherein the circumferential wall is integrally formed with the baffle plate, and has a double structure comprising an inner wall and an outer wall, wherein a space is formed between the inner wall and the outer wall.

2. The oil mist separator according to claim 1, wherein the circumferential wall is formed in such a manner that a welding jig can be inserted from the lower side between the inner wall and the outer wall.

3. The oil mist separator according to claim 2, wherein the inner wall and the outer wall are connected at the upper end part of the circumferential wall, and not connected at a lower end part of the circumferential wall.

4. The oil mist separator according to claim 1, wherein the separating member includes a collision board with which the blow-by gas having passed through the nozzle hole collides.

5. A method of manufacturing the oil mist separator according to claim 1, comprising:

welding the upper end part of the circumferential wall and the cylinder head cover in a state where a welding jig is inserted between the inner wall and the outer wall of the circumferential wall.

* * * * *